United States Patent [19]

Wildfang et al.

[11] Patent Number: 4,976,283

[45] Date of Patent: Dec. 11, 1990

[54] FLUID FLOW REGULATOR

[75] Inventors: Dieter Wildfang; Holger Nehm, both of Müllheim, Fed. Rep. of Germany

[73] Assignee: Dieter Wildfang KG, Müllheim, Fed. Rep. of Germany

[21] Appl. No.: 377,927

[22] Filed: Jul. 10, 1989

[30] Foreign Application Priority Data

Jul. 9, 1988 [DE] Fed. Rep. of Germany ....... 3823368
Nov. 30, 1988 [DE] Fed. Rep. of Germany ....... 3840331
Nov. 30, 1988 [DE] Fed. Rep. of Germany ....... 3840330

[51] Int. Cl.[5] ............................................. G05D 7/01
[52] U.S. Cl. ...................................... 137/504; 138/45; 138/46
[58] Field of Search .................. 137/504, 860; 138/45, 138/46

[56] References Cited

U.S. PATENT DOCUMENTS

| | | | |
|---|---|---|---|
| 2,802,486 | 8/1957 | Frey | 138/46 |
| 2,829,674 | 4/1958 | Segelhorst | 138/45 |
| 2,936,788 | 5/1960 | Dahl | 138/45 |
| 3,409,050 | 11/1968 | Weese | 138/45 |
| 3,847,178 | 11/1974 | Keppel | 138/46 X |
| 4,508,144 | 4/1985 | Bernett | 138/45 |

FOREIGN PATENT DOCUMENTS 2060751 11/1973 Fed. Rep. of Germany .
2616566 12/1979 Fed. Rep. of Germany .

*Primary Examiner*—Robert G. Nilson
*Attorney, Agent, or Firm*—Peter K. Kontler

[57] ABSTRACT

A flow regulator for water or other fluids has a housing with an internal shoulder between its inlet and outlet. The shoulder faces the inlet and slidably supports an elastically deformable annular flow restrictor which cooperates with a centrally located stud to define an annular passage extending from the inlet to the shoulder and followed by an annular portion of the channel between a conically diverging stepped or roughened internal surface of the housing and a stepped or roughened conical external surfaces of a guide member which carries the stud. Deformation, and hence the flow restricting action, of the flow restrictor depends upon the pressure differential which is established by the conveyed fluid. The flow restrictor has a conical internal surface which tapers in a direction from the inlet of the channel toward the shoulder, and the radially outermost portion of the flow restrictor has axially parallel slots or holes which weaken the adjacent portion of the flow restrictor so that the latter is more readily deformable and can properly control the flow of fluid which is conveyed at a relatively low pressure.

46 Claims, 5 Drawing Sheets

FLUID FLOW REGULATOR

BACKGROUND OF THE INVENTION

The invention relates to fluid flow regulators in general, especially to flow regulators which can be installed in or used in combination with conduits for liquid media. More particularly, the invention relates to improvements in fluid flow regulators of the type wherein a housing defines a channel for the flow of a fluid from the inlet to the outlet of the channel and the housing is provided with a socket for a deformable flow restrictor which serves to regulate the quantity of fluid flowing through the housing per unit of time. The flow restrictor undergoes elastic deformation the extent of which is a function of the pressure differential that is established by the fluid. Such flow regulators are further provided with studs which are spacedly surrounded by the normally annular flow restrictors to define with the latter annular passages for the conveyed fluid.

German Pat. No. 20 60 751 discloses a rather complex and expensive fluid flow regulator. In addition, the patented fluid flow regulator generates excessive noise and is incapable of regulating the flow of fluid with a high or even reasonably high degree of accuracy.

German Pat. No. 26 16 566 discloses a modified fluid flow regulator which generates less noise than the aforedescribed patented flow regulator. However, this flow regulator exhibits the serious drawback that its flow regulating action is quite erratic when the pressure of conveyed fluid is relatively low. In other words, while the flow regulator operates satisfactorily when the pressure of conveyed fluid is high, the quantity of conveyed fluid per unit of time departs considerably from a desired or optimum quantity when the pressure of conveyed fluid drops. In addition, this flow regulator is likely to become clogged after a relatively short period of use if the conveyed fluid carries solid particles.

OBJECTS OF THE INVENTION

An object of the invention is to provide a fluid flow regulator which is constructed and assembled in such a way that its characteristic curve is more satisfactory than those of conventional fluid flow regulators irrespective of whether the fluid (such as water) is admitted at an elevated pressure or at a low or very low pressure.

Another object of the invention is to provide a fluid flow regulator which is constructed in such a way that its reliability at low fluid pressures is just as satisfactory as, or at least approximates that, when the pressure of admitted fluid is high.

A further object of the invention is to provide a fluid flow regulator which is less likely to be clogged with solid ingredients of conveyed fluids than heretofore known fluid flow regulators.

An additional object of the invention is to provide a self-cleaning fluid flow regulator.

Still another object of the invention is to provide a novel and improved flow restrictor for use in the above outlined fluid flow regulator.

An additional object of the invention is to provide a novel and improved housing for the above outlined flow restrictor.

A further object of the invention is to provide a novel and improved method of enhancing the elasticity of the improved flow restrictor.

Another object of the invention is to provide a fluid flow regulator which generates little noise irrespective of whether the fluid is admitted at an elevated pressure or at a low pressure, which comprises a small number of simple and inexpensive parts, and which can be combined with existing stream regulators or like fluid flow controlling or influencing devices.

An additional object of the invention is to provide the fluid flow regulator with novel and improved noise reducing means and with novel and improved means for regulating and maintaining the speed of conveyed fluid at a desired value or within a desired range.

A further object of the invention is to provide a fluid flow regulator which can be used in connection with beverages and liquid or flowable foodstuffs without the danger of contaminating and/or otherwise affecting the desirable characteristics of foodstuffs.

SUMMARY OF THE INVENTION

One feature of the present invention resides in the provision of a fluid flow regulator which comprises a hollow housing defining a channel with a fluid-admitting inlet and a fluid-discharging outlet. The housing has an internal shoulder which surrounds a portion of the channel between the inlet and the outlet and faces the inlet, and the flow regulator further comprises an annular elastic flow restrictor which has an apertured portion which abuts the shoulder. The flow regulator further comprises a stud which is disposed substantially centrally of the channel and is surrounded by and defines with the flow restrictor an annular passage for the flow of fluid from the inlet toward the outlet. The cross-sectional area of the passage and the rate of fluid flow to the outlet vary in response to variations of fluid pressure and the resulting variations of the extent of deformation of the elastic flow restrictor. The aforementioned portion of the flow restrictor is preferably ring-shaped and has at least one aperture which extends in substantial parallelism with the direction of fluid flow from the inlet toward the outlet of the housing. As a rule, or at least in many instances, the ring-shaped portion of the flow restrictor will have a plurality of apertures, e.g., an annulus of apertures which are equidistant from each other in the circumferential direction of the flow restrictor. At least some of the apertures extend all the way through the ring-shaped portion.

The apertures of the ring-shaped portion are or can be provided at the peripheral surface of the ring-shaped portion. For example, the apertures can constitute slots which extend inwardly from the peripheral surface of the ring-shaped portion. Each slot can but need not extend substantially radially of the ring-shaped portion. For example, the ring-shaped portion can be provided with between two and fifteen, preferably ten or close to ten apertures. As mentioned above, at least some of the apertures can extend all the way through the ring-shaped portion. At least one aperture can have a polygonal or at least partially circular cross-sectional outline.

The flow restrictor can contain or can be made entirely of soft elastomeric material, such as silicone rubber. It is preferred to make the flow restrictor from a material which is compatible with foodstuffs, i.e., which will not affect the color, quality, taste and/or other desirable characteristics of foodstuffs.

In accordance with a presently preferred embodiment, the flow restrictor has a substantially conical internal surface which is adjacent the passage between such flow restrictor and the stud. The diameter of the internal surface preferably decreases in a direction from the inlet toward the outlet of the channel in the housing. The length of the stud is or can be less than the axial length of the internal surface. In other words, the stud need not project beyond the inlet (counter to the direction of fluid flow from the inlet toward the outlet).

The ring-shaped portion of the flow restrictor can be provided with a surface which abuts the shoulder in the housing. At least one aperture of the ring-shaped portion has or can have an end in the just mentioned surface of the ring-shaped portion, and such end of the at least one aperture is or can be bounded by a sharp edge.

The flow regulator further comprises a guide member which is disposed in the housing substantially between the shoulder and the outlet and is adjacent (and preferably rigid or integral with) the stud. The external surface of the guide member is spacedly surrounded by and defines with the housing an annular portion of the channel. A radially outwardly extending flange of the guide member at the outlet of the channel has one or more openings through which the fluid flows on its way from the annular portion of the channel. The annular portion of the channel preferably diverges in a direction from the passage toward the flange.

The internal surface of the housing around the annular portion of the channel and/or the external surface of the guide member can be scored, grooved, knurled, scratched and/or otherwise roughened. Moreover, the just mentioned internal surface of the housing and/or the external surface of the guide member can be stepped, preferably in such a way that it comprises a plurality of steps which extend in the circumferential direction of the flow restrictor. Each stepped surface can include substantially cylindrical first sections and annular second sections which alternate with the first sections and extend substantially at right angles to the direction of fluid flow in the annular portion of the channel. The first sections and the neighboring second sections of each stepped surface can define sharp annular edges or rounded annular edges. The cylindrical sections of each stepped surface can but need not have identical or nearly identical lengths. For example, at least two cylindrical sections of each stepped surface can have different axial lengths. The arrangement may be such that the axial length of each following first section (as seen in the direction of fluid flow in the annular portion of the channel) exceeds the axial length of the preceding first section. Alternatively, the axial length of each preceding first section can exceed the axial length of the following first section (again as seen in the direction of fluid flow in the annular portion of the channel). Each of the two confronting surfaces can be provided with a plurality of steps, and the steps of one of the surfaces can be staggered with reference to the steps of the other surface in the direction of fluid flow in the annular portion of the channel. The arrangement may be such that the external surface of the guide member can be stepped and the adjacent internal surface of the housing can be roughened or vice versa.

The annular portion of the channel preferably diverges in the direction of fluid flow from the passage toward the outlet. The guide member and/or the housing can be made of a suitable plastic material. Furthermore, the guide member can be mounted in or on the housing for movement substantially axially of the flow restrictor to thereby vary the rate of fluid flow in the channel. In addition, the flow regulator can comprise means for releasably holding the guide member in a selected position with reference to the housing. Such holding means can include mating internal threads in the housing and complementary external threads on the guide member.

The housing is or can be provided with an internal surface (such as a cylindrical internal surface) which spacedly surrounds the flow restrictor and is disposed between the shoulder and the inlet. Such housing can be further provided with at least one fluid admitting port which has a discharge end in the internal surface. For example, the housing can be provided with two ports which are disposed substantially diametrically opposite each other with reference to the axis of the internal surface. The discharge end of each port is or can be adjacent the internal shoulder of the housing, and each port can extend substantially radially of the flow restrictor. Alternatively, at least one of the ports (or the single port) can make an oblique angle with the axis of the flow restrictor.

Another feature of the invention resides in the provision of a fluid flow regulator which comprises a hollow housing defining a channel with a fluid-admitting inlet and a fluid-discharging outlet, and a guide member which is at least partly disposed in and defines with the housing an annular portion of the channel. The guide member includes a flange which is disposed at the outlet, and the flange has a plurality of openings through which the fluid flows from the annular portion of the channel. The guide member can be provided with the aforementioned stud which extends into the channel between the annular portion and the inlet. The flange of the guide member can be provided with an annulus of arcuate openings in the form of closed slots.

The novel features which are considered as characteristic of the invention are set forth in particular in the appended claims. The improved fluid flow regulator itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
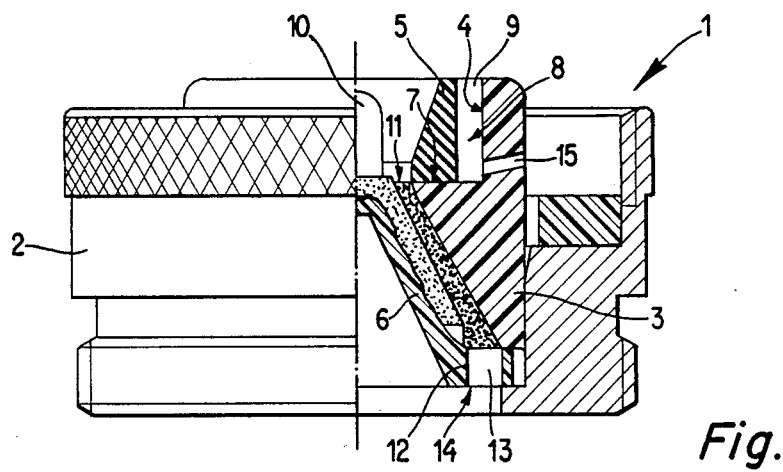
FIG. 1 is a partly elevational and partly central sectional view of a fluid flow regulator which embodies one form of the invention and is installed in the externally threaded casing of an adapter.

FIG. 1 shows a fluid flow regulator 1 which embodies one form of the present invention. This flow regulator has a housing 3 which is made of a suitable plastic material and is installed in the casing of an adapter 2. The housing 3 defines a channel with an inlet at the upper end (as seen in FIG. 1) and an outlet at the lower end. Furthermore, the housing 3 is formed with an annular internal shoulder 7 which is spaced apart from the inlet and outlet of the channel and is adjacent a cylindrical internal surface 4 extending from the shoulder 7 toward and normally all the way to the inlet. The flow regulator 1 further comprises an elastically deformable annular flow restrictor 5 having a surface 5a (FIG. 3) which abuts the shoulder 7, and a set of axially parallel apertures 8 (FIGS. 3 and 4) which are provided in a ring-shaped radially outermost portion 5b. Still further, the flow regulator 1 comprises a hollow frustoconical guide member 6 (see particularly FIGS. 8 and 9) which is spacedly surrounded by the housing 3 between the shoulder 7 and the outlet and cooperates with the housing to define an annular portion of the aforementioned channel. The flow restrictor 5 is deformable by the conveyed fluid (e.g., water) and is movable radially of the socket which is bounded by the internal surface 4 of the housing in order to change the cross-sectional outline of an annular passage 11 between the frustoconical internal surface 5c of the flow restrictor and the cylindrical or substantially cylindrical external surface of a relatively short; stud 10 forming an integral part of or being rigidly connected with the smaller-diameter end of the substantially frustoconical guide member 6.

The purpose of the flow restrictor 5 is to ensure that the quantity of conveyed fluid per unit of time is at least substantially constant irrespective of eventual variations of fluid pressure in the conduit which supplies fluid to the inlet of the channel in the housing 3, i.e., to the upper end of the annular passage 11 between the conical internal surface 5c of the flow restrictor 3 and the peripheral or external surface of the stud 10. The conical surface 5c tapers in a direction from the inlet toward the annular portion of the channel between the conical external surface of the guide member 6 and the adjacent conical internal surface of the housing 3 between the shoulder 7 and the outlet. The flow restrictor 5 is capable of performing the aforementioned quantity-regulating function because it is elastically deformable and because it is also movable radially of the stud 10 by sliding along the internal shoulder 7 of the housing 3. The extent of deformation of the flow restrictor 5 is a function of the pressure differential which develops while the fluid flows from the inlet to the outlet of the channel in the housing 3. As already mentioned above, such channel includes the passage 11 between the stud 10 and the conical internal surface 5c of the flow restrictor 3, and an annular portion which extends from the shoulder 7 toward the outlet and surrounds the conical external surface of the guide member 6. The surface 5a of the flow restrictor 5 is or can be in sealing engagement with the shoulder 7, and the latter is designed to permit radial movements of the flow restrictor in order to vary the cross-sectional area of the annular passage 11 which is surrounded by the conical internal surface 5c.

Figure 3:
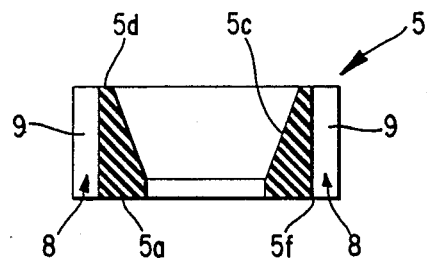
FIG. 3 is an axial sectional view of a flow restrictor which can be used in the improved fluid flow regulator.
Figure 4:
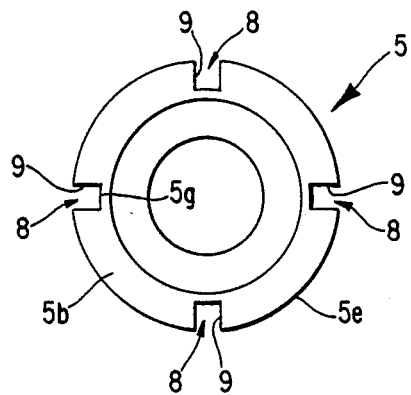
FIG. 4 is a plan view of the flow restrictor of FIG. 3.

FIGS. 3 and 4 show a first embodiment of the flow restrictor 3 wherein the ring-shaped portion 5b is provided with four equidistant apertures 8 in the form of slots 9 each of which is parallel with the axis of the flow restrictor and extends all the way from the upper end face 5d to the surface 5a. The slots 9 extend radially inwardly from the peripheral surface 5e of the ring-shaped portion 5b, and that end of each slot 9 which is provided in the surface 5a is or can be bounded by a relatively sharp edge, as at 5f.

Figure 2:
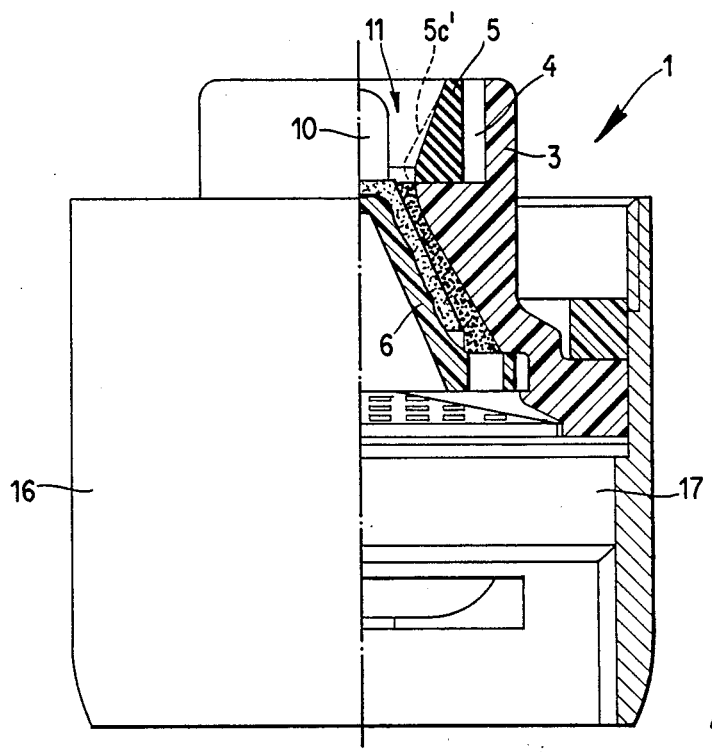
FIG. 2 is a partly elevational and partly central sectional view of a modified fluid flow regulator which is installed in a casing for a stream regulating device.

When the pressure of fluid which enters the inlet of the channel in the housing 3 rises, the flow restrictor 5 undergoes elastic deformation and reduces the cross-sectional area of the annular passage 11 between the conical internal surface 5c and the external surface of the stud 10. Deformation of the conical surface 5c is indicated in FIG. 2 by dotted lines, as at 5c'. The deformation of the flow restrictor 5 (such deformation is exaggerated in FIG. 2 for the sake of clarity) is normally more pronounced in the region adjacent the shoulder 7 of the housing 3. Such deformation is attributable to dynamic pressure or velocity head of the fluid in the space between the peripheral surface 5e of the ring-shaped portion 5b and the internal surface 4 of the housing 3. At least some deformation of the flow restrictor 5 would take place in the absence of any apertures in the ring-shaped portion 5b. However, it has been found that the apertures 8 (i.e., the slots 9 in the ring-shaped portion 5b) ensure practically hindrance-free penetration of fluid all the way to the shoulder 7. Fluid which has penetrated into the slots 9 acts upon the adjacent weakened (thinner) web-like portions 5g of the flow restrictor 5 and causes a pronounced radially inward deformation of such portions 5g to thus constrict the path for the flow of fluid from the inlet toward the annular portion of the channel between the guide member 6 and the surrounding portion of the housing 3.

The number of apertures 8 can be varied within a wide range (e.g., between two and fifteen), depending upon the selected operating pressure of conveyed fluid. The elasticity of the flow restrictor 5 increases if the number of apertures 8 is increased; this is particularly desirable and advantageous if the pressure of conveyed fluid is relatively low because even such fluid is capable of bringing about pronounced changes in the extent of deformation of the flow restrictor. In other words, if the flow restrictor 5 is readily deformable (as a result of appropriate selection of its material and/or as a result of selection of a large number of apertures), its sensitivity to changes of fluid pressure is increased to thus ensure that the flow restrictor can react to relatively minor changes of fluid pressure and can properly regulate the quantity of a fluid which is maintained at a relatively low or even very low pressure.

The cross-sectional area of the passage 11 can be selected in such a way that this passage is not readily clogged by impurities which are entrained by the fluid on its way from the inlet toward the outlet of the channel in the housing 3. Furthermore, the surfaces bounding the passage 11 are not likely to retain even relatively large particles of solid matter because the flow restrictor 5 is slidable along the shoulder 7 and can move radially of the internal surface 4 (when necessary) in order to widen a certain portion of the passage 11. Moreover, as the width of the passage 11 varies in response to changes of fluid pressure, the surface 5c of the flow restrictor 5 acts not unlike a bellows or a membrane and pumps any solid particles out of the passage so that the thus dislodged particles advance into the annular portion of the channel around the guide member 6.

One presently preferred material of the flow restrictor 5 is silicone rubber. Such material is compatible with foodstuffs (i.e., it does not adversely affect the appearance, taste, quality and/or other desirable characteristics of foodstuffs). Moreover, silicone rubber exhibits a highly pronounced rebound resiliency which is desirable and advantageous because this characteristic of the flow restrictor ensures that the latter reassumes its undeformed state in response to a reduction of fluid pressure within the conical surface 5c and around the peripheral surface 5e. Still further, silicone rubber can be shaped with a high degree of precision with tolerances as small as one or more hundredths of one millimeter.

Figure 8:
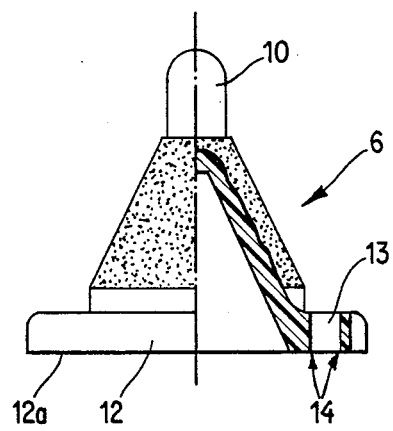
FIG. 8 is an elevational view of a first guide member which can be used in the improved fluid flow regulator, a portion of the guide member being broken away.
Figure 9:
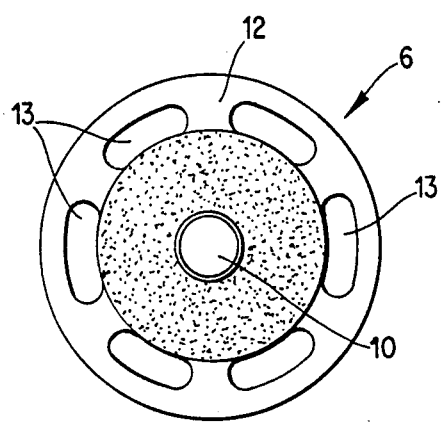
FIG. 9 is a plan view of the guide member which is shown in FIG. 8.

The large-diameter end or base of the frustoconical guide member 6 is formed with a radially outwardly extending circumferentially complete projection 12 (hereinafter called flange) which has a set of arcuate slot-shaped openings 13 (see FIG. 9). The illustrated openings 13 form an annulus having its center on the common axis of the guide member 6 and its stud 10. FIG. 9 shows six equidistant openings 13 of identical size and shape. As can be seen in FIG. 1, the openings 13 can be disposed in the region (actually downstream) of the outlet of the channel in the housing 3, and their combined cross-sectional area is or can be larger than the cross-sectional area of the adjacent end of annular portion of the channel between the base of the guide member 6 and the housing 3. Thus, the flange 12 does not oppose the rate of fluid flow from the housing but actually permits expansion at the outlet to thus ensure a more predictable regulation of fluid flow from the flow regulator 1. Moreover, the provision of a flange 12 with a relatively large number of relatively large openings 13 reduces the likelihood of clogging of the channel at of its outlet by solid particles which might be entrained by conveyed fluid (such as water). Those ends of the openings 13 which are provided in the bottom surface 12a of the flange 12 are preferably bounded by sharp edges 14 (FIG. 8). This not only promotes a breaking up of jets of fluid which pass through the openings 13 but also reduces the noise of the outflowing fluid medium.

The stippling of the conical external surface of the guide member 6 is intended to indicate that such surface is roughened. The same applies for the adjacent internal surface of the housing 1 (see, for example, FIG. 1). Roughening of the external surface of the guide member 6 and/or of the adjacent internal surface of the housing 3 also contributes to a reduction of noise and enhances adhesion of the conveyed fluid to such surfaces.

FIG. 1 further shows that the axial length of the stud 10 at the smaller-diameter end of the guide member 6 is less than the axial length of the conical internal surface 5c of the flow restrictor 5. In other words, the preferably rounded head of the stud 10 need not project beyond the outer end face 5d of the flow restrictor 5. Since the conical internal surface 5c tapers in a direction toward the shoulder 7 and toward the smaller-diameter end of the conical guide member 6, the cross-sectional area of the passage 11 decreases in the direction of fluid flow with attendant rise in velocity and drop in pressure of conveyed fluid. Therefore, the fluid in the narrowest portion of the passage 11 in the region of the shoulder 7 offers a relatively small resistance to radial shifting of the flow restrictor 5 along the shoulder 7.

That portion of the housing 3 which surrounds the internal surface 4 is or can be provided with one or more bypass ports 15 (FIG. 1 shows a single port 15 because the other port or ports are concealed by the flow restrictor 5 and/or adapter casing 2). For example, the housing 3 can be provided with two ports 15 which are located diametrically opposite each other with reference to the axis of the internal surface 4. The discharge ends of the ports 15 are immediately or closely adjacent the shoulder 7, and each such port can extend substantially radially of the flow restrictor 5. However (and as actually shown in FIG. 1), it is also possible to select the orientation of one or more ports 15 in such a way that their axes make oblique angles with the axis of the cylindrical internal surface 4. Fluid which enters the housing 3 by way of one or more ports 15 also contributes to radial shifting of the flow restrictor 3 and/or to more reliable deformation or termination or reduction of deformation, depending upon whether the pressure of admitted fluid rises or drops. It has been found that the ports 15 are very effective if the inclination of their axes with reference to the plane of the shoulder 7 does not exceed 50° and is preferably in the range of 15°.

The number of ports 15 can match, exceed or be less than the number of apertures 8 in the ring-shaped portion 5b of the flow restrictor 5. The arrangement can be such that each port 15 discharges fluid into one of the apertures 8 to thus further promote deformation of the web-shaped weakened portions 5g in response to increasing pressure of fluid which is admitted into the space around the ring-shaped portion 5b by way of the inlet and/or by way of one or more ports 15.

The adapter 2 of FIG. 1 can be installed in a fitting or valve. The outlet of the channel in the housing 3 can discharge fluid into a stream regulator. For example, the preferably externally threaded adapter 2 can be screwed into the housing of a stream regulator. FIG. 2 shows a modification wherein a somewhat different housing 3 of the flow regulator 1 is installed in a mouthpiece 16 which further contains a stream regulator 17 adjacent the outlet of the channel in the housing 3.

Figure 5:
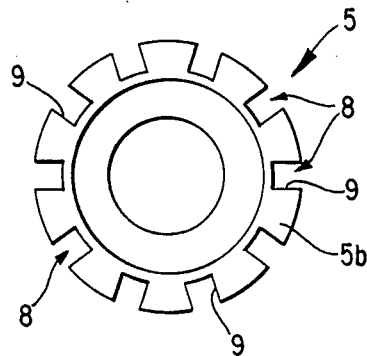
FIG. 5 is a plan view of a modified flow restrictor.

FIG. 5 shows a flow restrictor 5 wherein the ring-shaped portion 5b is formed with ten equidistant apertures 8 each of which is a slot 9 having an open side in the peripheral surface of the ring-shaped portion 5d.

Figure 6:
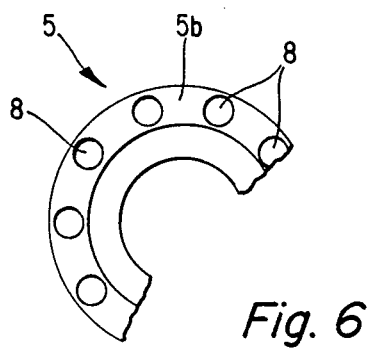
FIG. 6 is a fragmentary plan view of a third flow restrictor.

FIG. 6 shows a portion of a further flow restrictor 5 wherein the apertures 8 are holes each of which has a circular or oval (nearly circular) cross-sectional outline. The holes or apertures 8 are located radially inwardly of the peripheral surface of the ring-shaped portion 5b.

Figure 7:
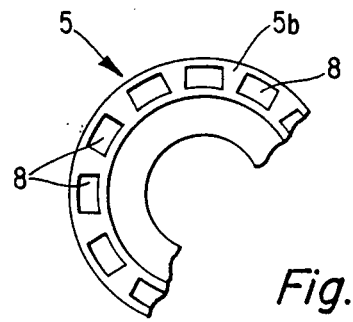
FIG. 7 is a fragmentary plan view of a fourth flow restrictor.

FIG. 7 shows a portion of a further flow restrictor 5 wherein the ring-shaped portion 5b has an annulus of equidistant apertures 8 each of which is a hole having a polygonal (e.g., square or rectangular) cross-sectional outline. Flow restrictors with apertures having cross-sectional outlines other than those shown in FIGS. 4 to 7 can be used with equal or similar advantage. As mentioned above, the number, distribution, configuration and dimensions of the apertures 8 will depend on the required sensitivity of the flow restrictor and upon the expected range of pressures of conveyed fluid.

Since the flow restrictor 5 of the improved flow regulator is or can be readily deformable (the deformability is much more pronounced than that of a flow restrictor having a constant wall thickness from end to end and being devoid of apertures corresponding to the apertures 8 of the improved flow restrictor), its dimensions can be reduced (together with the dimensions of the entire flow regulator) without affecting the desirable properties of the flow regulator.

The design of FIGS. 3–5 (with apertures 8 in the form of radially extending open slots 9) is preferred at this time because the flow restrictor 5 can be mass-produced at a low cost and because the open slots 9 greatly enhance the deformability of the flow restrictor. A relatively large number of apertures 8 is desirable on the ground that this greatly enhances the deformability of the flow restrictor 5 as well as the uniformity of deformation, i.e., that portion of a strongly deformed flow restrictor which abuts the shoulder 7 will closely resemble a ring so that the rate of fluid flow in the adjacent portion of the passage 11 will be more uniform than if the flow restrictor were provided with a relatively small number of apertures.

Figure 10:
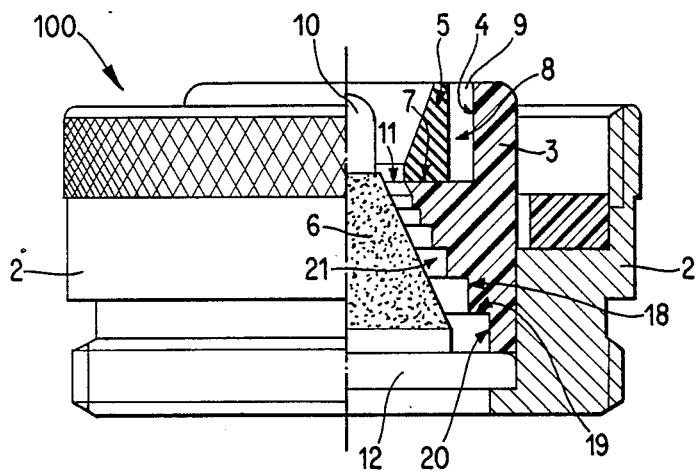
FIG. 10 is a partly elevational and partly sectional view of a fluid flow regulator wherein the housing is provided with a stepped internal surface which is adjacent the guide member.

FIG. 10 shows a modified fluid flow regulator 100 having a modified housing 3 which is installed in an externally threaded and knurled adapter casing 2. The main difference between the flow regulator 100 and the flow regulator 1 of FIG. 1 is that the housing 3 of the flow regulator 100 has a stepped internal surface 18 which surrounds the roughened conical external surface of the guide member 6 and defines with the latter a conically diverging annular portion 21 of the channel between the inlet and outlet of the housing 3. The configuration of the upper portion of the housing 3 (as seen in FIG. 10), of the guide member 6 and its stud 10, and of the flow restrictor 5 is or can be the same as described with reference to the flow regulator 1. The purpose of the roughened conical external surface of the guide member 6 is to reduce noise, or to prevent the generation of excessive noise, when a fluid (e.g., water) is caused to flow into the passage 11 and thence into the annular portion 21 of the channel in the housing 3.

The stepped internal surface 18 of the housing 3 in the region around the annular channel portion 21 is composed of relatively short cylindrical sections 20 and annular sections 19 which alternate with the cylindrical sections 20 and are disposed in planes extending transversely of the direction of fluid flow in the annular channel portion 21.

Figure 11:
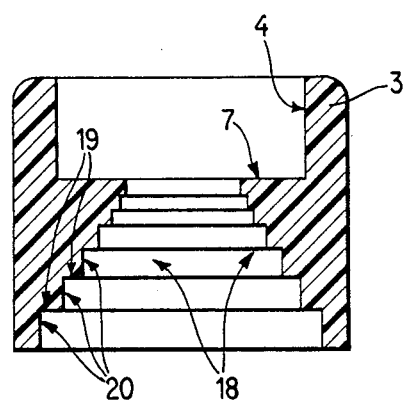
FIG. 11 is an axial sectional view of the housing in the flow regulator of FIG. 10.
Figure 12:
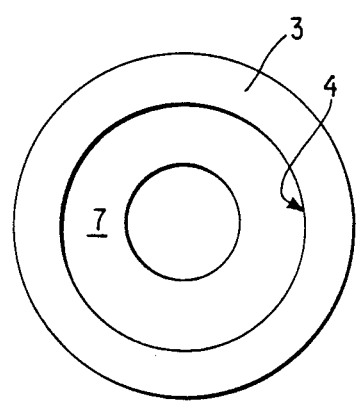
FIG. 12 is a plan view of the housing which is shown in FIGS. 10 and 11.

FIGS. 10 and 11 show that the axial length of neighboring cylindrical sections 20 increases in the direction of fluid flow toward the flange 12 of the guide member 6. Thus, the shortest cylindrical section 20 is adjacent the shoulder 7 and the longest cylindrical section 20 is adjacent the flange 12. Such dimensioning of the cylindrical sections 20 is preferred at this time because it entails a reduction of the speed of fluid in the channel portion 21 with attendant reduction of noise when the flow regulator 100 is in use. Thus, the cross-sectional area of the channel portion 21 increases in a direction from the shoulder 7 toward the flange 12 proportionally or substantially proportionally with a reduction of the speed of conveyed fluid. Therefore, the speed of fluid which leaves the flow regulator 100 via openings in the flange 12 is relatively low.

FIGS. 10 and 11 show that the annular edges between the sections 19 and 20 of the stepped internal surface 18 of the housing 3 are relatively sharp. Such sharp edges break up the flow of and thus decelerate the fluid with attendant reduction of noise. However, it is equally within the purview of the invention to provide the internal surface 18 with rounded edges between the cylindrical sections 20 and the adjacent annular sections 19.

FIG. 11 further clearly shows the socket which is bounded by the cylindrical internal surface 4 and the annular shoulder 7 of the housing 3. The shoulder 7 cooperates with the ring-shaped portion 5b of the flow restrictor 5 to prevent the flow of fluid directly from the apertures 8 into the channel portion 21. In addition, the shoulder 7 provides a seat for the surface 5a and enables the flow restrictor 5 to move radially of the stud 10 and of the cylindrical internal surface 4.

Figure 13:
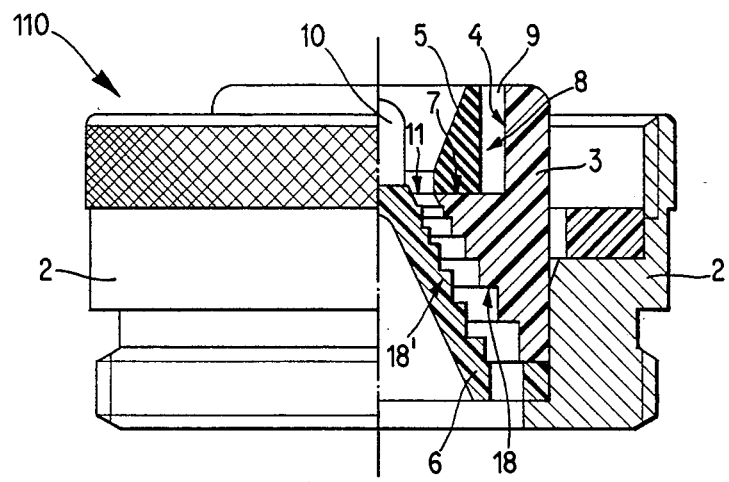
FIG. 13 is a partly elevational and partly central sectional view of a fluid flow regulator wherein the guide member is also provided with a stepped surface.

FIG. 13 shows a flow regulator 110 which is identical with the flow regulator 100 of FIG. 10 except that the conical external surface 18' of the guide member 6 is also stepped. The height of cylindrical sections 20 of both stepped surfaces 18 and 18' increases in a direction from the passage 11 toward the flange 12. In addition, the steps of the surface 18 are staggered with reference to the steps of the surface 18', i.e., the annular sections 19 of the surface 18 and the annular sections 19 of the surface 18' are disposed at different levels.

Figure 14:
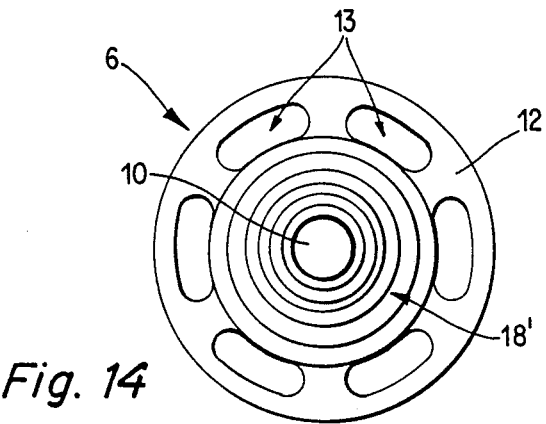
FIG. 14 is a plan view of the guide member in the flow regulator of FIG. 13.
Figure 15:
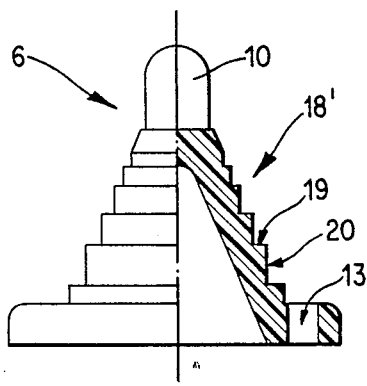
FIG. 15 is a partly elevational and partly central sectional view of the guide member of FIGS. 13 and 14.

FIG. 14 shows that the distribution and configuration of openings 13 in the flange 12 of the guide member 6 which is used in the flow regulator 110 of FIG. 13 is the same as that of openings 13 in the flange 12 of the flow regulator which is shown in FIG. 9.

The housing 3 and/or the guide member 6 (with the stud 10) can be mass-produced from a suitable plastic material.

Figure 16:
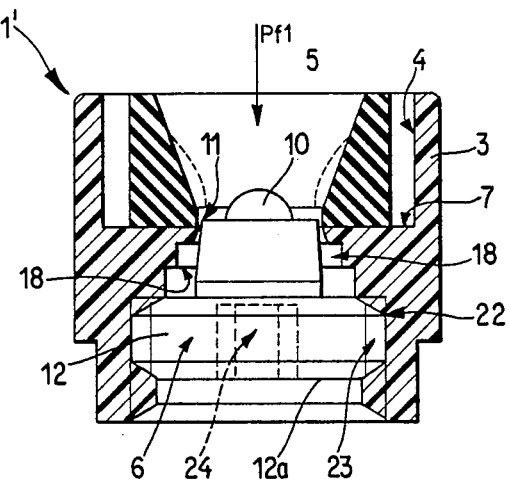
FIG. 16 is a central sectional view of a further fluid flow regulator wherein the guide member is adjustable in and counter to the direction of fluid flow through the housing.

FIG. 16 shows a flow regulator 1' wherein the guide member 6 and its stud 10 are movable in and counter to the direction of arrow Pf1. To this end, the flange 12 of the guide member 6 has external threads 22 mating with complementary internal threads 23 of the adjacent portion of the housing 3. These threads constitute a means for holding the guide member 6 in a selected axial position in which the guide member ensures that the fluid can flow through the housing 3 at a desired rate. The bottom surface 12a of the flange 12 is formed with a centrally located polygonal socket 24 to receive the working end of a suitable tool which is used to change the axial position of the guide member 6 in or counter to the direction of arrow Pf1. The socket 24 is accessible at the outlet end of the housing 3. The guide member 6 can be detached from the housing 3 of FIG. 16 for use in another housing. Thus, any one of a single series of guide members can be used in any one of a variety of housings (e.g., in housings with or without stepped internal surfaces 18). This contributes to lower cost of the improved flow regulator and renders it possible to reduce the number of spare parts which must be held in storage in an establishment which distributes, assembles, replaces and/or repairs flow regulators embodying the present invention.

The provision of steps in the internal surface 18 of the housing 3 and/or in the external surface 18' of the guide member 6 constitutes a feature which is novel per se. It has been found that such stepped surface or surfaces contribute to pronounced deceleration of the fluid in the region of the outlet of the housing 3 and thereby contribute to a pronounced reduction of noise. Experiments indicate that, when the fluid is conveyed at a rate of approximately 12 liters per minute, the improved flow regulator produces little noise, especially if at least one of the surfaces 18, 18' is a stepped surface. The sections 19, 20 of the stepped surfaces can be formed at a low cost in readily available machines. The provision of relatively sharp annular edges between the neighboring sections 19 and 20 is particularly important on the surface 18' of the guide member 6 but such sharp edges are also preferred on the conical internal surface 18 of the housing 3. As explained above, these annular sections and the sharp edges reduce the speed of the conveyed fluid and thus contribute to a reduction of noise.

The feature that the axial length of the sections 20 on the stepped surface 18 and/or 18' increases in the direction of fluid flow in the annular portion 21 of the channel also enhances the desirable characteristics of the flow regulator and of the conveyed fluid. Thus, the volume of the annular portion 21 increases in the direction of fluid flow which, in turn, reduces noise.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A fluid flow regulator comprising a hollow housing defining a channel with a fluid-admitting inlet and a fluid-discharging outlet and having a shoulder surrounding a portion of said channel between said inlet and said outlet and facing said inlet; an annular elastic flow restrictor including a portion abutting said should and having at least one aperture which is closed in the region of said shoulder; and a stud disposed substantially centrally of said channel and surrounded by and defining with said flow restrictor an annular passage for the flow of fluid from said inlet to said outlet thereby the cross-sectional area of said passage and the rate of fluid flow to said outlet vary in response to variations of fluid pressure and the resulting variations of the extent of deformation of the elastic flow restrictor.

2. The flow regulator of claim 1, wherein said portion of said flow restrictor is substantially ring shaped and said at least one aperture extends in substantial parallelism with the direction of flow of fluid from said inlet to said outlet.

3. The flow regulator of claim 2, wherein said flow restrictor has a substantially conical internal surface which is adjacent said passage and the diameter of which decreases in the direction of fluid flow from said inlet toward said outlet.

4. The flow regulator of claim 3, wherein said internal surface has a first axial length and said stud has a second length less than said first length, said stud extending into said passage counter to the direction of fluid flow from said inlet toward said outlet.

5. The flow regulator of claim 2, wherein said at least one aperture has an at least partly circular cross-sectional outline.

6. The flow regulator of claim 2, wherein said flow restrictor contains a soft elastomeric material, such as silicone-rubber.

7. The flow regulator of claim 2, wherein said flow restrictor consists of a material which is compatible with foodstuffs.

8. The flow regulator of claim 2, wherein said ring-shaped portion has a surface abutting said shoulder and said at least one aperture has an end in said surface, said ring-shaped portion having a sharp edge bounding the end of said at least one aperture.

9. The flow regulator of claim 2, further comprising a guide member disposed in said housing between said shoulder and said outlet and adjacent said stud, said guide member having an external surface spacedly surrounded by and defining with said housing an annular portion of said channel and said guide member further having a flange at said outlet and said flange having a plurality of openings through which the fluid flows from said annular portion of said channel.

10. The flow regulator of claim 9, wherein said annular portion of said channel diverges in a direction from said passage toward said outlet.

11. The flow regulator of claim 9, wherein said housing has an internal surface adjacent said portion of said channel, at least one of said surfaces being roughened.

12. The flow regulator of claim 9, wherein said housing has an internal surface adjacent said portion of said channel, at least one of said surfaces being stepped.

13. The flow regulator of claim 12, wherein said at least one surface has a plurality of steps extending in the circumferential direction of said flow restrictor.

14. The flow regulator of claim 13, wherein said at least one surface includes substantially cylindrical first sections and annular second sections alternating with said first sections and disposed in planes extending substantially at right angles to the direction of fluid flow in said annular portion of said channel.

15. The flow regulator of claim 14, wherein said first sections and the neighboring second sections of said at least one surface define sharp annular edges.

16. The flow regulator of claim 14, wherein said first sections and the neighboring second sections of said at least one surface define rounded edges.

17. The flow regulator of claim 14, wherein said cylindrical sections have substantially identical axial lengths.

18. The flow regulator of claim 14, wherein at least two of said first sections have different axial lengths.

19. The flow regulator of claim 14, wherein the axial length of each following first section exceeds the axial length of the preceding first section as seen in the direction of fluid flow in said portion of said channel.

20. The flow regulator of claim 14, wherein the axial length of each preceding first section exceeds the axial length of the following first section as seen in the direction of fluid flow in said portion of said channel.

21. The flow regulator of claim 13, wherein each of said surfaces has a plurality of steps and the steps of one of said surfaces are staggered with reference to the steps of the other of said surfaces in the direction of fluid flow in said portion of said channel.

22. The flow regulator of claim 13, wherein said internal surface has a plurality of steps and said external surface is roughened.

23. The flow regulator of claim 22, wherein said annular portion of said channel diverges in a direction toward said outlet.

24. The flow regulator of claim 9, wherein said guide member contains or consists of a plastic material.

25. The flow regulator of claim 9, wherein said housing contains or consists of a plastic material.

26. The flow regulator of claim 9, wherein said guide member is movable in said housing substantially axially of said flow restrictor to thereby vary the rate of fluid flow in said channel.

27. The flow regulator of claim 26, further comprising means for releasably holding said guide member in a selected position with reference to said housing.

28. The flow regulator of claim 27, wherein said holding means includes mating threads on said guide member and on said housing.

29. The flow regulator of claim 9, wherein said stud is rigid with said guide member.

30. A fluid flow regulator comprising a hollow housing defining a channel with a fluid-admitting inlet and a fluid-discharging outlet and having a shoulder surrounding a portion of said channel between said inlet and said outlet and facing said inlet; an annular elastic flow restrictor having a substantially ring-shaped portion abutting said shoulder and having a plurality of apertures which extend in substantial parallelism with the direction of flow of fluid from said inlet to said outlet; and a stud disposed substantially centrally of said channel and surrounded by and defining with said flow restrictor an annular passage for the flow of fluid from said inlet to said outlet whereby the cross-sectional area of said passage and the rage of fluid flow to said outlet vary in response to variations of fluid pressure and the resulting variations of the extent of deformation of the elastic flow restrictor.

31. The flow regulator of claim 30, wherein said apertures are substantially equidistant from each other in the circumferential direction of said ring-shaped portion.

32. The flow regulator of claim 30, wherein at least some of said apertures extend through said ring-shaped portion.

33. The flow regulator of claim 30, wherein said ring-shaped portion has a peripheral surface and said apertures are provided in the region of said peripheral surface.

34. The flow regulator of claim 33, wherein at least one of said apertures is a slot extending inwardly from said peripheral surface.

35. The flow regulator of claim 34, wherein said slot extends substantially radially of said ring-shaped portion.

36. The flow regulator of claim 30, wherein said ring-shaped portion has between two and fifteen, particularly ten, apertures.

37. The flow regulator of claim 36, wherein at least some of said apertures extend through said ring-shaped portion.

38. A fluid flow regulator comprising a hollow housing defining a channel with a fluid-admitting inlet and a fluid-discharging outlet and having a shoulder surrounding a portion of said channel between said inlet and said outlet and facing said inlet; an annular elastic flow restrictor having a substantially ring-shaped portion abutting said shoulder and having at least one aperture which extends in substantial parallelism with the direction of flow of fluid from said inlet to said outlet, said at least one aperture having a polygonal cross-sectional outline; and a stud disposed substantially centrally of said channel and surrounded by and defining with said flow restrictor an annular passage for the flow of fluid from said inlet to said outlet whereby the cross-sectional area of said passage and the rate of fluid flow to said outlet vary in response to variations of fluid pressure and the resulting variations of the extent of deformation of the elastic flow restrictor.

39. A fluid flow regulator comprising a hollow housing defining a channel with a fluid-admitting inlet and a fluid-discharging outlet and having a shoulder surrounding a portion of said channel between said inlet and said outlet and facing said inlet; an annular elastic flow restrictor having a substantially ring-shaped portion abutting said shoulder and having at least one aperture which extends in substantial parallelism with the direction of flow of fluid from said inlet to said outlet, said housing having an internal surface disposed between said shoulder and said inlet and spacedly surrounding said flow restrictor, said housing further having at least one fluid admitting pot with a discharge end in said internal surface; and a stud disposed substantially centrally of said channel and surrounded by and defining with said flow restrictor an annular passage for the flow fluid from said inlet to said outlet whereby the cross-sectional area of said passage and the rate of fluid flow to said outlet vary in response to variations of fluid pressure and the resulting variations of the extent of deformation of the elastic flow restrictor.

40. The flow regulator of claim 39, wherein said internal surface is a cylindrical surface and said housing two ports which are disposed substantially diametrically opposite each other.

41. The flow regulator of claim 39, wherein said discharge end is adjacent said shoulder.

42. The flow regulator of claim 39, wherein said at least one port extends substantially radially of said flow restrictor.

43. The flow regulator of claim 39, wherein said port makes an oblique angle with the axis of said flow restrictor.

44. A fluid flow regulator comprising a hollow housing defining a channel with a fluid-admitting inlet and a fluid-discharging outlet; and a guide member disposed in and defining with said housing an annular portion of said channel, said guide member including a flange at said outlet and said flange having a plurality of arcuate closed slot-shaped openings through which the fluid flows from said annular portion.

45. The flow regulator of claim 44, wherein said guide member has a stud extending into said channel between said annular portion and said inlet.

46. The flow regulator of claim 44, wherein said flange has an annulus of openings.

* * * * *